(12) United States Patent
Mir

(10) Patent No.: US 11,273,393 B2
(45) Date of Patent: Mar. 15, 2022

(54) SNAP ON STRAINER WITH SIDE-SLIDE CLEANING

(75) Inventor: Ashfaq Mir, Fountain Valley, CA (US)

(73) Assignee: Xylem IP Holdings, LLC, White Plains, NY (US)

( * ) Notice: Subject to any disclaimer, the term of this patent is extended or adjusted under 35 U.S.C. 154(b) by 1596 days.

(21) Appl. No.: 11/374,411

(22) Filed: Mar. 13, 2006

(65) Prior Publication Data
US 2006/0226066 A1    Oct. 12, 2006

Related U.S. Application Data

(60) Provisional application No. 60/661,986, filed on Mar. 14, 2005.

(51) Int. Cl.
*B01D 24/00* (2006.01)
*B01D 29/01* (2006.01)

(52) U.S. Cl.
CPC ........ *B01D 29/01* (2013.01); *B01D 2201/305* (2013.01)

(58) Field of Classification Search
CPC . B01D 29/01; B01D 2201/305; F16B 5/0016; F16B 5/0012; F16B 5/0664; F16B 5/0657
USPC .................. 210/473, 447, 477, 483; 292/138
See application file for complete search history.

(56) References Cited

U.S. PATENT DOCUMENTS

| | | | | |
|---|---|---|---|---|
| 1,931,899 A | * | 10/1933 | McLeod | ................. F16B 21/09 24/100.5 |
| 3,538,940 A | * | 11/1970 | Graham | ................ F16L 37/144 137/271 |
| 3,700,020 A | * | 10/1972 | Wallace | ................. F16B 21/09 411/512 |
| 3,788,484 A | * | 1/1974 | Godin | ........................... 210/447 |
| 4,204,960 A | * | 5/1980 | Sugiyama et al. | ............ 210/232 |
| 4,376,053 A | * | 3/1983 | Bullock et al. | ............... 210/767 |

(Continued)

OTHER PUBLICATIONS

Oxford Dictionary, "The Concise Oxford Dictionary, Tenth Edition," ed. Judy Pearsall, pub. Oxford University Press, New York, 1999, 3 pages. (Year: 1999).*

*Primary Examiner* — Bobby Ramdhanie
*Assistant Examiner* — Denise R. Anderson
(74) *Attorney, Agent, or Firm* — Ware, Fressola, Maguire & Barber LLP

(57) ABSTRACT

The present invention features a device having a strainer cover assembly having a strainer cover with tab openings, and a strainer housing having flexible tabs arranged thereon, the flexible tabs passing through the tab openings and fastening on the strainer cover with a snap action. The flexible tabs are deflected for removing the strainer cover. The strainer cover assembly includes a strainer with a screen for filtering a medium passing through the device. The snap action of the flexible tabs makes it easy to open, slide out and clean the screen on the strainer cover assembly. The strainer cover assembly and the screen may be formed as an integral unit, which helps in cleaning the screen. In operation, the user simply compresses the snap tabs and slides out the screen which is attached to the strainer cover assembly and rinses the contaminated screen while holding it by the strainer cover assembly. The integral unit being formed by plastic mold injection. The screen may be made of stainless steel material. The strainer cover assembly may be made of a clear plastic material.

11 Claims, 4 Drawing Sheets

(56) References Cited

U.S. PATENT DOCUMENTS

| | | | | |
|---|---|---|---|---|
| 4,453,747 | A * | 6/1984 | Bimba | F16L 37/144 |
| | | | | 285/238 |
| 4,600,221 | A * | 7/1986 | Bimba | F16L 37/008 |
| | | | | 285/305 |
| 4,715,095 | A * | 12/1987 | Takahashi | F16B 5/065 |
| | | | | 24/297 |
| 4,838,901 | A * | 6/1989 | Schmidt et al. | 95/90 |
| 4,845,916 | A * | 7/1989 | Villard | F16B 5/0664 |
| | | | | 40/209 |
| 5,211,973 | A * | 5/1993 | Nohren, Jr. | 426/82 |
| 5,236,478 | A | 8/1993 | Lewis et al. | |
| 5,494,497 | A | 2/1996 | Lee | |
| 5,568,946 | A * | 10/1996 | Jackowski | F16L 37/0987 |
| | | | | 285/38 |
| 5,660,726 | A * | 8/1997 | Dluzik | 210/130 |
| 5,906,292 | A * | 5/1999 | Rider, Jr. | 220/839 |
| 5,979,687 | A * | 11/1999 | Hayes et al. | 220/4.23 |
| 6,171,039 | B1 * | 1/2001 | Seurujarvi | F16B 33/002 |
| | | | | 411/148 |
| 6,736,969 | B2 | 5/2004 | Milne | |
| 6,863,085 | B2 | 3/2005 | Marty et al. | |
| 6,910,501 | B2 | 6/2005 | Marty et al. | |
| 2002/0024223 | A1 * | 2/2002 | Bolduc et al. | 292/138 |

* cited by examiner

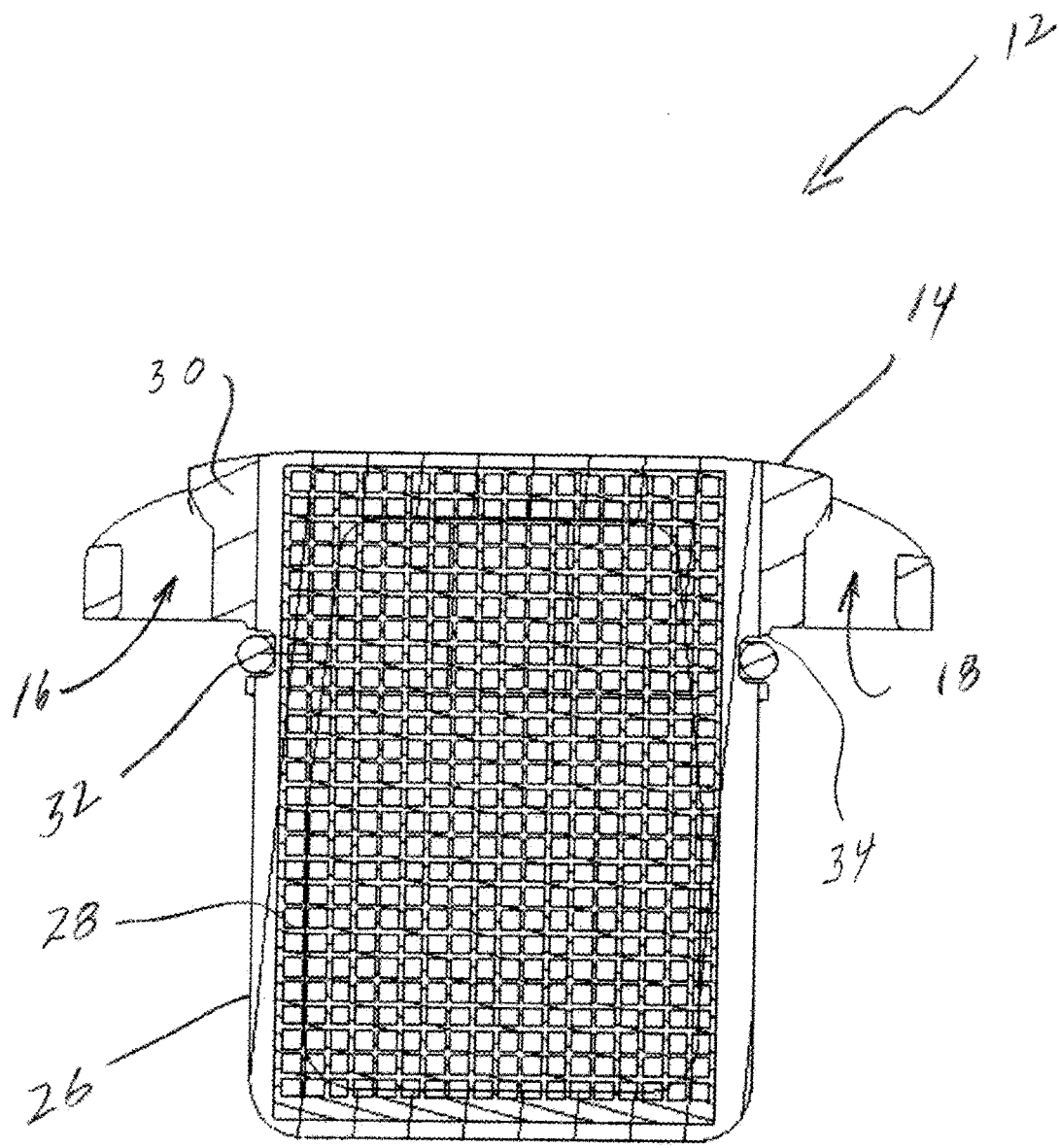
Figure 3a: The Strainer Cover Assembly

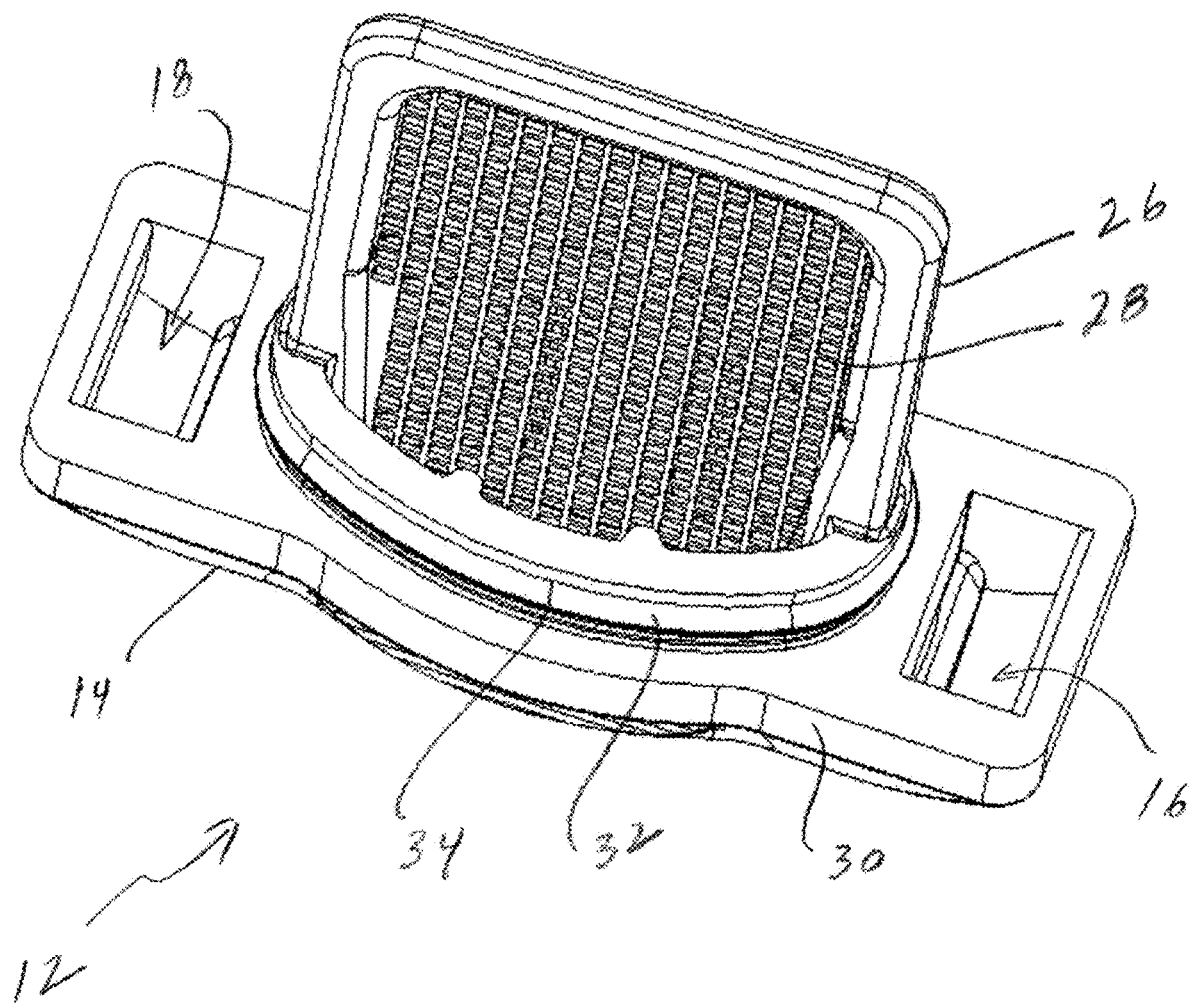
Figure 3b: The Strainer Cover Assembly

SNAP ON STRAINER WITH SIDE-SLIDE CLEANING

CROSS-REFERENCE TO RELATED APPLICATIONS

This application relates to provisional patent application Ser. No. 60/661,986, filed on 14 Mar. 2005, which is hereby incorporated by reference in their entirety.

BACKGROUND OF THE INVENTION

1. Field of the Invention

The present invention relates to a strainer; and more particularly relates to a strainer for low flow pumping applications.

2. Brief Description of Related Art

Most strainers known in the art and found in the marketplace have very cumbersome and tedious methods like bayonet latch, threaded bowl, screws, etc. for fastening the strainer cover to the strainer housing.

Some of the shortcomings include that the known strainer devices are hard to open and close to clean the strainer, have to connect and disconnect the entire strainer assembly from the plumbing to clean, and require cleaning the strainer by touching/handling the contaminated metal screen.

There is a need in the industry for a better strainer device.

SUMMARY OF THE INVENTION

In its broadest sense, the present invention features a device having a strainer assembly having a strainer cover with first coupling members; and a strainer housing having second coupling members, at least one of the second coupling members coupling with at least one of the first coupling members with a snap action for fastening the strainer cover and the strainer housing together.

The first coupling members may include tab openings and the second coupling members may include flexible tabs arranged on the strainer housing and passing through the tab openings. Alternatively, the second coupling members may include tab openings, and the first coupling members include flexible tabs arranged on the strainer cover and passing through the tab openings.

Moreover, embodiments are envisioned in which the first coupling members may include a tab opening and a hinge member and the second coupling members may include a flexible tab arranged on the strainer housing and passing through the tab opening and a corresponding hinge member for coupling to the hinge member. Alternatively, the second coupling members may include a tab opening and a hinge member and the first coupling members may include a flexible tab for passing through the tab opening and a corresponding hinge member for coupling to the hinge member.

In one particular embodiment, the strainer device features a strainer cover assembly having a strainer cover with two tab openings, and a strainer housing having two flexible tabs arranged thereon, the flexible tabs passing through the tab openings and fastening on the strainer cover to the strainer housing with a snap action. The flexible tabs are deflected for removing the strainer cover from the strainer housing.

The strainer cover assembly includes a strainer portion with a screen for filtering a medium passing through the strainer device. The snap action of the flexible tabs makes it easy to open, slide out and clean the screen on the strainer cover assembly.

The strainer cover assembly and the screen may be formed as an integral unit, which helps in cleaning the screen. In operation, the user simply compresses the snap tabs and slides out the screen which is attached to the strainer cover assembly and rinses the contaminated screen while holding it by the cover portion of the strainer cover assembly. The integral unit being formed by plastic mold injection as a co-molded unit. The screen may also be made of stainless steel material and coupled to the strainer portion. The strainer cover assembly may be made of a clear plastic material.

The strainer housing may also include a quick connect port having a groove for receiving a retaining clip to connect a hose or other suitable plumbing to the quick connect port, as well as a quick connect adapter having an O-ring to connect a hose or other suitable plumbing to the quick connect adapter.

One advantage of the strainer device according to the present invention is that the strainer cover assembly may be manufactured to include screens having different filtering properties.

In a preferred embodiment, the strainer device is a filtering device for use in beverage, industrial, recreational vehicle (RV), military and/or marine low flow pumping applications.

BRIEF DESCRIPTION OF THE DRAWING

FIG. 3*a* is a cross-sectional view of a strainer cover assembly according to the present invention, and FIG. 3*b* is a perspective view of a strainer cover assembly according to the present invention.

DETAILED DESCRIPTION OF THE INVENTION

Figure 1:
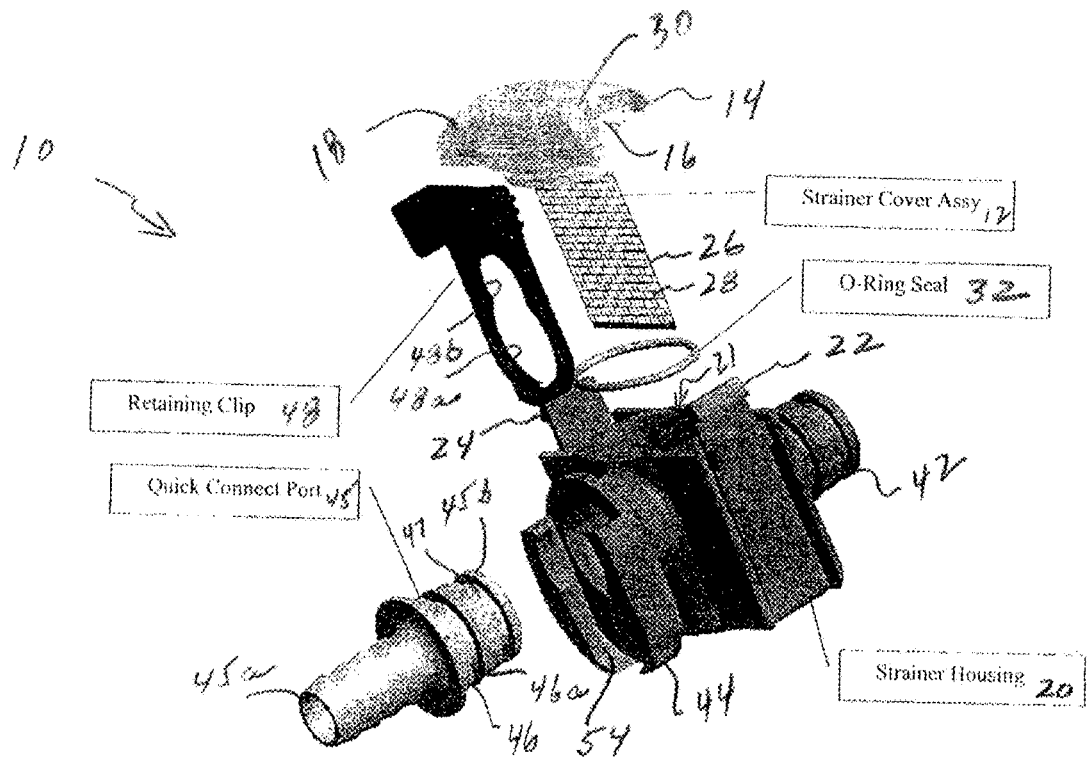
FIGS. 1 and 2 are perspective views of a strainer device according to the present invention.
Figure 2:
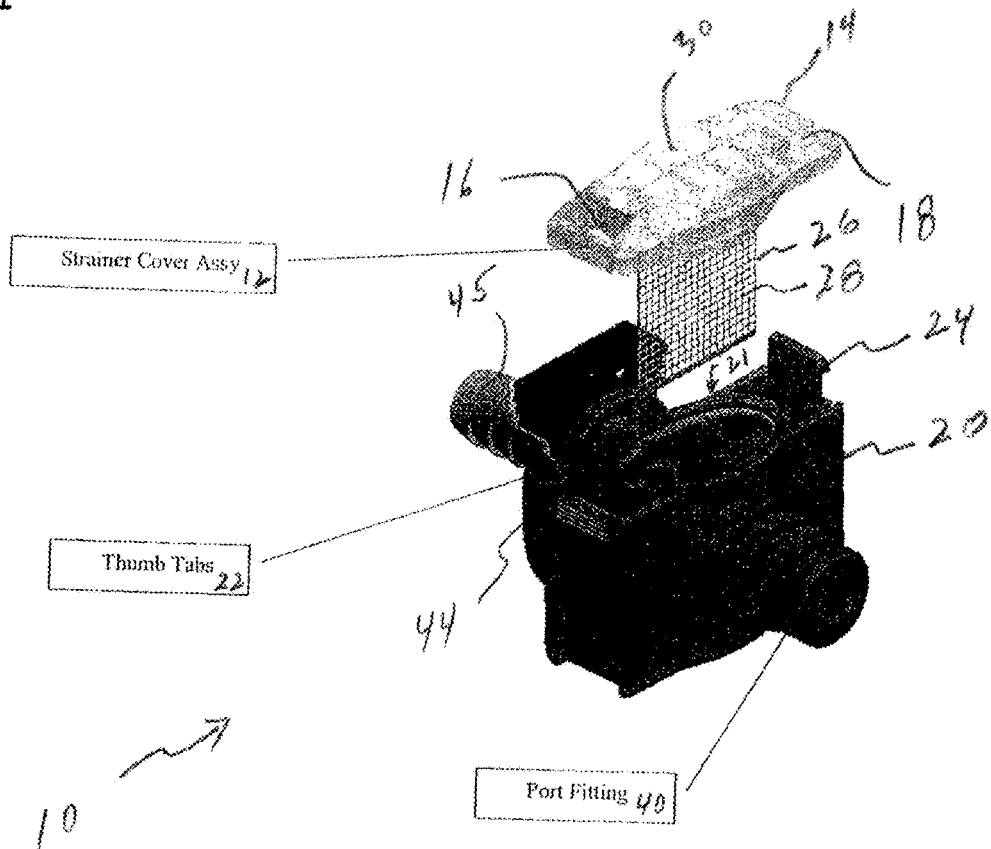
Figure 4:
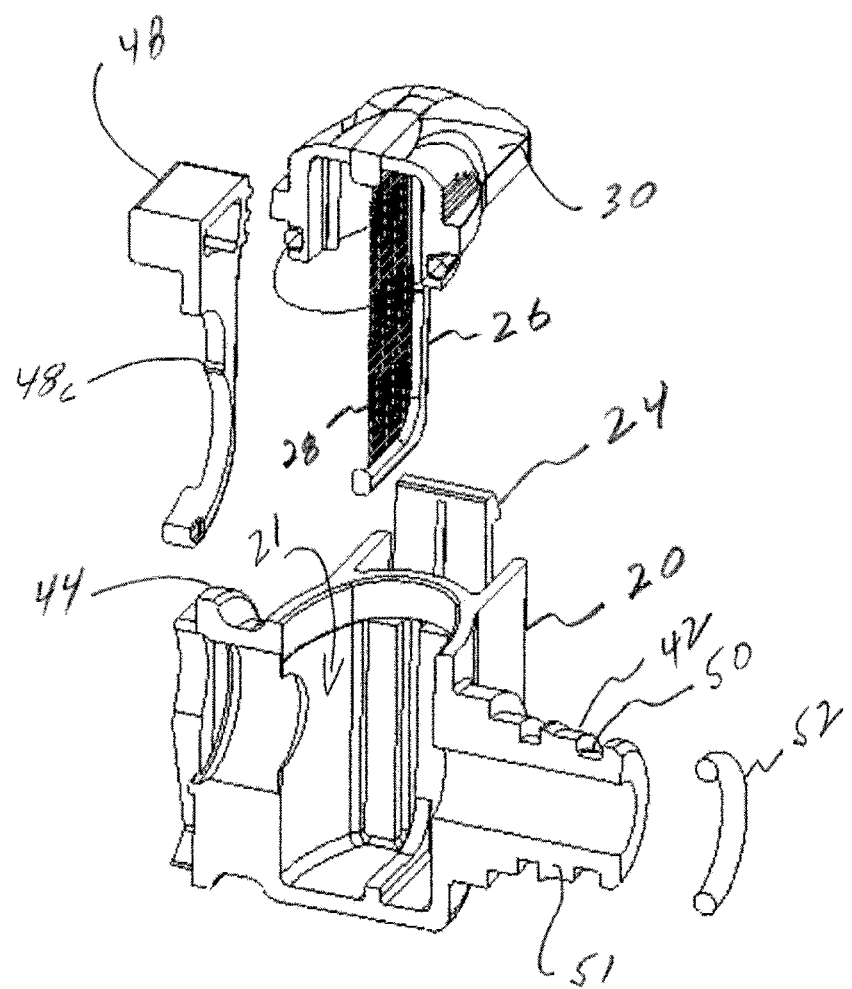
FIG. 4 is a perspective, cross-sectional, view of the strainer device according to the present invention.

The present invention features a strainer device generally indicated as 10 in FIGS. 1-2 having a strainer cover assembly 12 having a strainer cover 14 with tab openings 16, 18 (see also FIGS. 3*a* and 3*b*), and a strainer housing 20 having flexible tabs 22, 24 arranged thereon. In operation, the flexible tabs 22, 24 pass through the tab openings 16, 18, deflect inwardly and fasten on the strainer cover assembly 12 to the strainer housing 20 with a snap action when the strainer cover assembly 12 is inserted into a housing opening 21 (see also FIG. 4). The flexible tabs 22, 24 are deflected for removing the strainer cover assembly 12.

The strainer cover assembly 12 includes a strainer portion 26 having a screen 28 for filtering a medium passing through the device, as best shown in FIGS. 3*a* and 3*b*. The scope of the invention is not intended to be limited to the type or kind of medium being strained or filtered. The snap action of the flexible tabs 22, 24 makes it easy to open, slide out and clean the screen 28 on the strainer cover assembly 12.

The strainer cover assembly 12 and the screen 28 may be formed as an integral unit, which helps in cleaning the screen. In operation, a user simply compresses the snap tabs 22, 24 inwardly as shown and slides out the screen 28 which is attached to the strainer cover assembly 12 and rinses the contaminated screen 28 while holding it by the strainer cover 14. The integral unit being co-molded and formed by plastic mold injection as a one piece unit. In this embodiment, the screen portion 28 and a cover portion indicated as 30 are formed as one integral molded unit. The strainer cover assembly 12 may be made of a clear plastic material, as well as being made of an opaque material. The scope of the invention is not intended to be limited to the type or kind of material either now known or later developed in the future being used to make the strainer cover assembly 12.

The screen 28 may also be made of stainless steel material, although the scope of the invention is not intended to be limited to any particular type or kind of material. Embodiments are envisioned in which the screen is made of other types or kinds of materials either now known or later developed in the future. The scope of the invention is also not intended to be limited to the dimensions or filtering characteristics or properties of the screen 28.

The strainer device 10 may also include an O-ring 32 arranged in an O-ring groove 34 that seals the strainer cover assembly 12 in the strainer housing 20 when assembled together.

Strainer Housing Ports

The strainer housing 20 has two ports, port fittings or openings 40, 42 for passing effluent through the strainer housing 20 that needs to be filtered.

The strainer housing 20 may also include a quick connect port 45 having a groove 46 for receiving a retaining clip 48 to connect a hose or other suitable plumbing (not shown) to the quick connect port 45. As shown, the quick connect port 45 connects to the plumbing on one end 45a and plugs into the port 44 of the strainer housing 20 on the other end 45b, and may be sealed by an O-ring (not shown) and held in place by the sliding retaining clip 48. The quick connect port 45 may also include another groove 47 for receiving an O-ring (not shown) for sealing the end 45b of the quick connect port 45 in the port 44.

The retaining clip 48 has one larger sized openings 48a, one smaller sized openings 48b and a friction retaining tab 48c between the two openings 48a, 48b. In operation, the retaining clip 48 is seated in a groove 54 of the strainer housing 20, and the larger sized opening 48a is dimensioned for receiving one end 45b of the quick connect port 45. Once the one end 45b of quick connect port 45 is inserted into the port 44 of the strainer housing 20, the retainer clip 48 is slid downwardly as shown and coupled with a snap-seating to retain the quick connect port 45 into the port 44 so that the smaller sized opening 48b is fitted into the groove 46 and the friction retaining tab 48c is snapped over the outer circumferential surface 46a of the groove 46, securely holding the quick connect port 45 into the port 44.

As shown, by way of example, the other port 42 of the strainer housing 20 has a quick connect adapter 51 built into the strainer housing 20, which can snap to a pump or other suitable device (not shown). The quick connect adapter 51 may include an O-ring groove 50 for receiving an O-ring 52 to connect a hose or other suitable plumbing (not shown) to the quick connect adapter 51. Embodiments are also envisioned in which the strainer housing 20 has two ports similar to port 44 for coupling two quick connect ports such as 45 on each side of the strainer housing 20.

The Snap Action Coupling Members

The scope of the invention is not intended to be limited to any particular type or kind of coupling members either now known or later developed in the future for fastening the strainer cover and the strainer housing together with a snap action.

Embodiments are envisioned in which the strainer device has a strainer assembly having a strainer cover with first coupling members, and a strainer housing having second coupling members, wherein at least one of the second coupling members coupling with at least one of the first coupling members with a snap action for fastening the strainer cover and the strainer housing together. By way of example, the first coupling members may include tab openings, and the second coupling members may include flexible tabs arranged on the strainer housing and passing through the tab openings; alternatively, the second coupling members may include tab openings, and the first coupling members include flexible tabs arranged on the strainer cover and passing through the tab openings.

Moreover, embodiments are also envisioned in which the first coupling members may include a tab opening and a second member such as a hinge member, and the second coupling members may include a flexible tab arranged on the strainer housing and passing through the tab opening and a corresponding second member such as a hinge member for coupling to the hinge member. Alternatively, the second coupling members may include a tab opening and a hinge member and the first coupling members may include a flexible tab for passing through the tab opening and a corresponding hinge member for coupling to the hinge member.

Possible Applications

Possible applications of the device include it being used as a filtering device in beverage, industrial, recreational vehicle (RV), military and/or marine low flow pumping applications.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

I claim:

1. A strainer device for filtering a medium, comprising:
a strainer cover assembly having a strainer cover with tab openings formed therein, and also having a strainer portion with a screen configured to filter a medium passing through the strainer device;
a strainer housing having two ports configured to pass the medium through the strainer housing, and also having a housing opening configured to receive the strainer portion with the screen, and also having flexible tabs arranged thereon, each flexible tab configured to pass through a respective tab opening, deflect inwardly, and fasten onto the strainer cover with a snap action when the strainer portion is inserted into the housing opening, and each flexible tab also configured to deflect, compress inwardly and pass back through the respective tab opening to remove the strainer cover assembly from the strainer housing, at least one port of the two ports having a groove formed therein configured to connect a quick connect port having an end with a corresponding groove formed therein; and a retaining clip having a larger-sized opening portion with an opening formed therein, and also having a smaller-sized opening portion with a corresponding opening formed therein that is smaller than the opening of the larger-sized opening portion, the groove of the at least one port configured to receive the retaining clip so that the end of the quick connect port is received in the larger-sized opening portion, the retaining clip configured to slide into the groove with a snap seating to retain the end of the quick connect port so that the smaller-sized opening portion is fitted into the corresponding groove to hold the end of the quick connect port onto the at least one port.

2. A strainer device according to claim 1, wherein the strainer cover assembly and the screen are formed as an integral unit.

3. A strainer device according to claim 2, wherein the integral unit is formed by plastic mold injection.

4. A strainer device according to claim 2, wherein the screen is made of stainless steel material.

5. A strainer device according to claim 2, wherein the strainer cover assembly is made of a clear plastic material.

6. A strainer device according to claim 1, wherein the strainer device comprises the quick connect port.

7. A strainer device according to claim 1, wherein the flexible tabs are configured on each side of the housing opening.

8. A strainer device according to claim 1, wherein the retaining clip comprises an intermediate friction retaining tab portion configured between the larger-sized opening portion and the smaller-sized opening portion and snapped over an outer circumferential surface of the end of the quick connect port for securely holding the end of the quick connect port into the at least one port when the retaining clip slides into the groove with the snap seating to retain the end of the quick connect port.

9. A strainer device according to claim 1, wherein the strainer device includes an O-ring configured to seal the strainer cover assembly in the strainer housing when assembled.

10. A strainer device according to claim 9, wherein the strainer cover assembly includes an O-ring groove configured to receive the O-ring.

11. A strainer device for filtering a medium, comprising:

a strainer cover assembly having a strainer cover with tab openings formed therein, and also having a strainer portion with a screen configured to filter a medium passing through the strainer device, the strainer cover assembly and the screen being formed as an integral unit;

a strainer housing having two ports configured to pass the medium through the strainer housing, and also having a housing opening configured to receive the strainer portion with the screen, and also having flexible tabs arranged thereon on each side of the housing opening, each flexible tab configured to pass through a respective tab opening, deflect inwardly, and fasten onto the strainer cover with a snap action when the strainer portion is inserted into the housing opening, and each flexible tab also configured to deflect, compress inwardly and pass back through the respective tab opening to remove the strainer cover assembly from the strainer housing, at least one port of the two ports having a groove formed therein configured to connect a quick connect port having an end with a corresponding groove formed therein; and a retaining clip having a larger-sized opening portion with an opening formed therein, and also having a smaller-sized opening portion with a corresponding opening formed therein that is smaller than the opening of the larger-sized opening portion, the groove of the at least one port configured to receive the retaining clip so that the end of the quick connect port is received in the larger-sized opening portion, the retaining clip configured to slide into the groove with a snap seating to retain the end of the quick connect port so that the smaller-sized opening portion is fitted into the corresponding groove to hold the end of the quick connect port onto the at least one port.

* * * * *